(12) United States Patent
Soga (10) Patent No.: US 8,831,967 B2
(45) Date of Patent: Sep. 9, 2014

(54) WORKFLOW MANAGEMENT USING A TO-DO LIST

(75) Inventor: Masaya Soga, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 635 days.

(21) Appl. No.: 12/642,457

(22) Filed: Dec. 18, 2009

(65) Prior Publication Data

US 2010/0185477 A1 Jul. 22, 2010

(30) Foreign Application Priority Data

Jan. 20, 2009 (JP) ................................ 2009-010405

(51) Int. Cl.
*G06Q 10/00* (2012.01)
*G06Q 10/06* (2012.01)

(52) U.S. Cl.
CPC .......... *G06Q 10/06* (2013.01); *G06Q 10/06311* (2013.01); *G06Q 10/0633* (2013.01)
USPC ........................................ 705/7.26; 705/7.27

(58) Field of Classification Search
CPC .............................................. G06Q 10/06316
USPC ............................................... 705/7.11–7.42
See application file for complete search history.

(56) References Cited

U.S. PATENT DOCUMENTS

| | | | | |
|---|---|---|---|---|
| 5,799,297 | A * | 8/1998 | Goodridge et al. ..................... 1/1 |
| 6,151,583 | A * | 11/2000 | Ohmura et al. .............. 705/7.26 |
| 2002/0103683 | A1 | 8/2002 | Tsuda et al. |
| 2002/0128735 | A1* | 9/2002 | Hawkins et al. ................ 700/86 |
| 2003/0018512 | A1* | 1/2003 | Dortmans ......................... 705/9 |
| 2003/0101133 | A1* | 5/2003 | DeFrancesco et al. ......... 705/38 |
| 2004/0215552 | A1* | 10/2004 | Horn et al. ....................... 705/38 |
| 2004/0216039 | A1* | 10/2004 | Lane et al. ...................... 715/511 |
| 2005/0027578 | A1* | 2/2005 | Chambers et al. ................ 705/8 |
| 2005/0027651 | A1* | 2/2005 | DeVault ........................... 705/38 |
| 2005/0065836 | A1 | 3/2005 | Tanaka et al. |
| 2006/0074714 | A1* | 4/2006 | Aziz et al. ......................... 705/2 |
| 2008/0229305 | A1* | 9/2008 | Maeda et al. ................. 718/100 |
| 2009/0012834 | A1* | 1/2009 | Fahey ................................ 705/9 |
| 2009/0240549 | A1* | 9/2009 | Slawson et al. ................... 705/9 |

FOREIGN PATENT DOCUMENTS

| | | |
|---|---|---|
| JP | 10-063751 | 3/1998 |
| JP | 2002-245214 A | 8/2002 |
| JP | 2004-252506 A | 9/2004 |
| JP | 2005-202920 A | 7/2005 |
| JP | 2006-163891 A | 2/2006 |

* cited by examiner

*Primary Examiner* — Justin M Pats
*Assistant Examiner* — Sujay Koneru
(74) *Attorney, Agent, or Firm* — Fitzpatrick, Cella, Harper & Scinto

(57) ABSTRACT

A workflow management apparatus including a workflow table in which tasks are associated with respective users and a task list that is a list of tasks corresponding to a user. The apparatus identifies the user in charge of a target task that is the target of processing in the workflow and determines whether or not the processing of the target task has been completed. If the apparatus has determined that the processing has not been completed, the apparatus determines whether or not the target task meets a predetermined condition. If the apparatus has determined that the predetermined condition is met, the target task is registered in the task list corresponding to the user in charge of the target task, and when the target task has been registered and is thus considered to have been processed, the apparatus advances to the processing of the next task in the workflow.

5 Claims, 12 Drawing Sheets

USER B'S ToDo LIST

| TASK | CONTENT | DEADLINE | COMMENTS | WORKFLOW LINK |
|------|---------|----------|----------|---------------|
| ToDo 1 | CREATE REPORT OF MALFUNCTION A | ... | - | - |
| ToDo 2 | CREATE SPECIFICATION A | 2008/5/30 | CORRECT SECTION 2 | WF-B-TASK D |
|  |  |  |  |  |
|  |  |  |  |  |
|  |  |  |  |  |

WORKFLOW MANAGEMENT USING A TO-DO LIST

BACKGROUND OF THE INVENTION

1. Field of the Invention

The present invention relates to a workflow management apparatus, method, and storage medium storing a program for managing work operations.

2. Description of the Related Art

Electronic documents have become the core of work operations, and systems that can manage electronic documents and work operations in association with each other are becoming more and more necessary. Workflow management systems are widely used as such systems, processing documents according to a predefined flow of work operations called a workflow. For example, with an approval system, a workflow such as "creation (general worker)→auditing (section head)→approval (division head)" is created in advance, and payment slips, proposals, and so on are then processed in accordance with that workflow.

However, with such a workflow management system, detailed settings regarding the flow are made in advance, and thus there is a problem in that when the workflow is to be used in various departments, the workflow cannot be adjusted to the work operations thereof and advanced in a flexible manner. For example, with a task in which a user A creates and delivers two documents, or documents A and B, if the document A has already been created but the document B has not been created yet, the workflow cannot proceed, and there are cases where the work operations therefore stop. Accordingly, issues arise with respect to the advancement of work operations in cases where the flow cannot be set with flexibility.

In order to address such problems, a system capable of dividing tasks into completed tasks and incomplete tasks and then confirming the user of the next task only for completed tasks has been proposed, as disclosed in Japanese Patent Laid-Open No. 10-63751.

However, in such a conventional workflow management system, it is necessary to first sort out the individual operations that make up conventional work operations, such as the settlement of transportation costs, the approval of specifications, and so on, and then design a workflow that consolidates those individual operations into a single flow. For this reason, it is necessary to design a workflow in advance for each work operation. In addition, there is another problem in that managing the system design, changes, and so on incurs costs.

Furthermore, it is necessary to operate a workflow engine to control complex flows, which requires the system such as a PC to have high processing capabilities, thus leading to greater costs when constructing the system. It has therefore been difficult to implement a workflow management system that can execute work operations in a flexible manner.

The workflow management system disclosed in Japanese Patent Laid-Open No. 10-63751 is capable of dividing a single defined task into multiple operations and confirming the person in charge of the next task only for the completed operations among the multiple operations contained in the task. However, because a single task within a workflow is divided into individual operations, the system ultimately cannot advance to the next step in the workflow until the incomplete operations have been completed.

Furthermore, when there is only a single operation, the task cannot be divided, making it impossible to construct a flexible workflow management system.

SUMMARY OF THE INVENTION

An aspect of the present invention is to eliminate the above-mentioned problems with the conventional technology. The present invention provides a workflow management apparatus, method, and storage medium storing a program capable of advancing a workflow in a flexible manner.

The present invention in its first aspect provides a workflow management apparatus that manages a workflow composed of one or more tasks, the apparatus comprising: a task list that is a list of tasks corresponding to a user; an identification unit configured to identify the user in charge of a target task that is the target of processing in the workflow; a first determination unit configured to determine whether or not the processing of the target task has been completed; a second determination unit configured to, in the case where the result by the first determination unit indicates that the processing has not been completed, determine whether or not the target task meets a predetermined condition; a registration unit configured to, in the case where the result by the second determination unit indicates that the predetermined condition is met, register the target task in the task list corresponding to the user in charge of the target task; and an advancement control unit configured to, when the target task has been registered by the registration unit and is thus considered to have been processed, advance to the processing of the next task in the workflow.

The present invention in its second aspect provides a workflow management method executed in a workflow management apparatus that manages a workflow composed of one or more tasks and includes a task list that is a list of tasks corresponding to a user, the method comprising the steps of: identifying the user in charge of a target task that is the target of processing in the workflow; determining whether or not the processing of the target task has been completed; determining, in the case where the result of the first determining step indicates that the processing has not been completed, whether or not the target task meets a predetermined condition; registering, in the case where the result of the second determining step indicates that the predetermined condition is met, the target task in the task list corresponding to the user in charge of the target task; and advancing, when the target task has been registered by the registration and is thus considered to have been processed, to the processing of the next task in the workflow.

The present invention in its third aspect provides a computer-readable medium in which is stored workflow management program for managing a workflow composed of one or more tasks, the program causing a computer to: identify the user in charge of a target task that is the target of processing in the workflow; determine whether or not the processing of the target task has been completed; determine, in the case where it has been determined that the processing has not been completed, whether or not the target task meets a predetermined condition; register, in the case where it has been determined that the predetermined condition is met, the target task in the task list corresponding to the user in charge of the target task; and advance, when the target task has been registered and is thus considered to have been processed, to the processing of the next task in the workflow.

According to the present invention, it is possible to advance a workflow in a flexible manner.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Hereinafter, embodiments of the present invention shall be described in detail with reference to the drawings. Note that identical constituent elements shall be given identical reference numerals, and descriptions thereof shall be omitted.

First Embodiment

Figure 1:
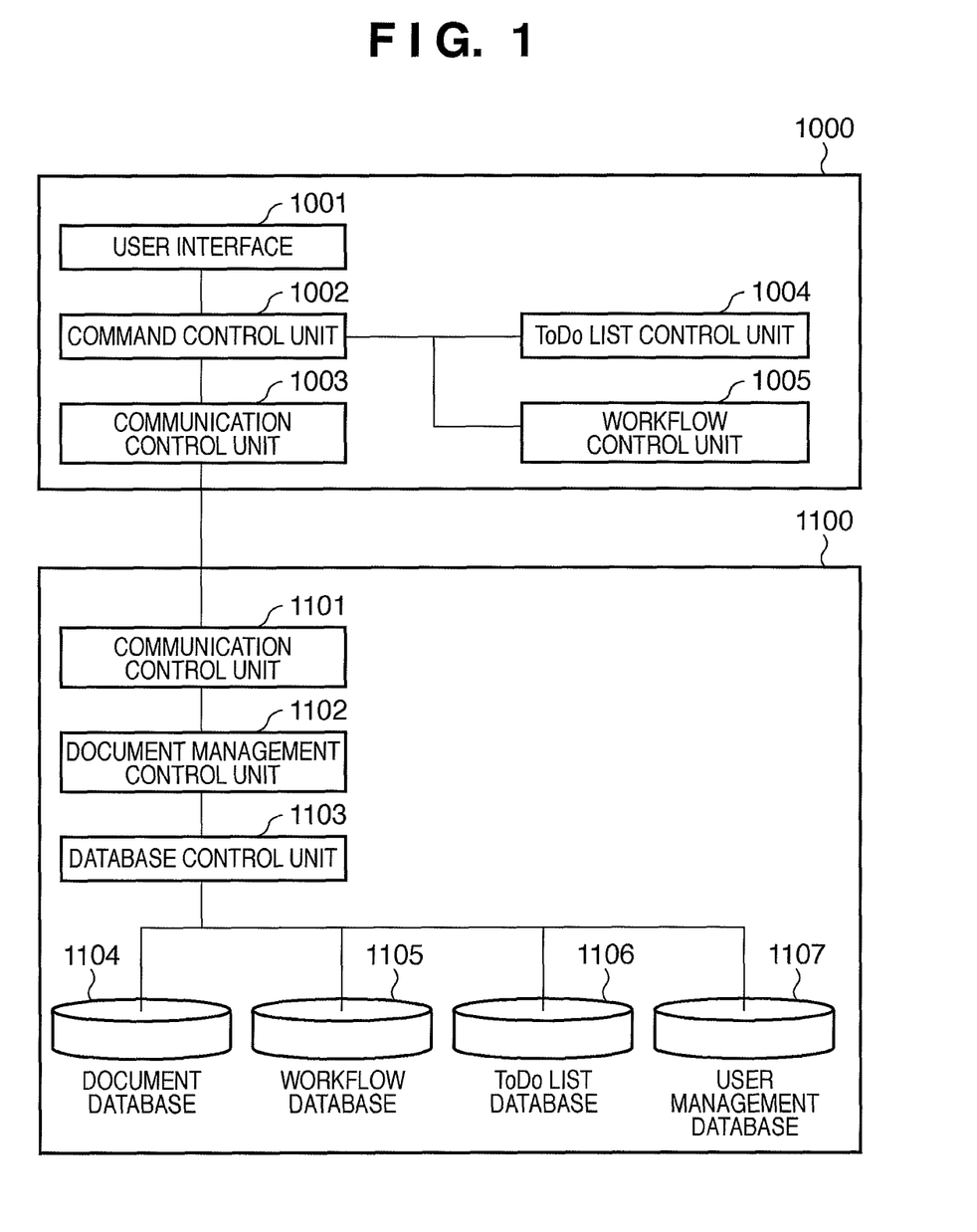
FIG. 1 is a block diagram illustrating the configuration of a workflow management system according to an embodiment.

A first embodiment of the present invention shall be described hereinafter with reference to FIGS. 1 through 12.
<System Configuration>
FIG. 1 is a block diagram illustrating the configuration of a workflow management system according to an embodiment. Client software 1000 indicates client software for the workflow management system. Server software 1100 indicates server software for the workflow management system. The client software 1000 is software that runs on an OS in a client computer ("client" hereinafter) configured of a CPU, RAM, ROM, HDD, and the like. Meanwhile, the server software 1100 is software that runs on an OS in a server computer ("server" hereinafter) configured of a CPU, RAM, ROM, HDD, and the like. However, in the present embodiment, the configuration may be such that the client software and the server software are both installed in a single computer.

The system accepts user operations via a user interface 1001, and communicates those user operations to a command control unit 1002.

The command control unit 1002 uses a communication control unit 1003, a to-do list control unit 1004, and a workflow control unit 1005 to return operation results to the user interface 1001 in response to operation requests made by the user.

The communication control unit 1003 communicates with the server software 1100 based on commands from the command control unit 1002.

The workflow control unit 1005 controls workflows based on commands from the command control unit 1002. Here, users and those users' tasks are managed on a workflow-by-workflow basis, and the workflow management system can carry out task management on a workflow-by-workflow basis.

The to-do list control unit 1004 controls a to-do list based on commands from the command control unit 1002. A "to-do list" is a list created for each user registered in the workflow management system. The workflow management system can manage set tasks on a user-by-user basis. In addition to tasks transferred (transited) from workflows, tasks set by a user can also be registered in this to-do list.

In the present embodiment, tasks are set in the workflow and to-do list respectively, as described above. In addition, in this workflow management system, workflow tasks that fulfill certain conditions can be transferred as tasks of a user's to-do list.

As a result, in the present embodiment, a task defined by a workflow can also be managed as a task of a user's to-do list. Then, when the processing of that task is completed, the to-do list control unit 1004 notifies the workflow control unit 1005 thereof, upon which the processing of the workflow task is officially complete.

A communication control unit 1101 in the server software 1100 communicates with the client software 1000 based on commands from a document management control unit 1102.

In response operation requests from the client software 1000, the document management control unit 1102 returns operation results to the client software 1000 via the communication control unit 1101 using a database control unit 1103.

The database control unit 1103 controls a document database 1104, a workflow database 1105, and a to-do list database 1106 in response to commands from the document management control unit 1102.

The document database 1104 stores document information, whereas the workflow database 1105 stores workflow information. Furthermore, the to-do list database 1106 stores to-do list information, and a user management database 1107 stores user information.

Figure 12:
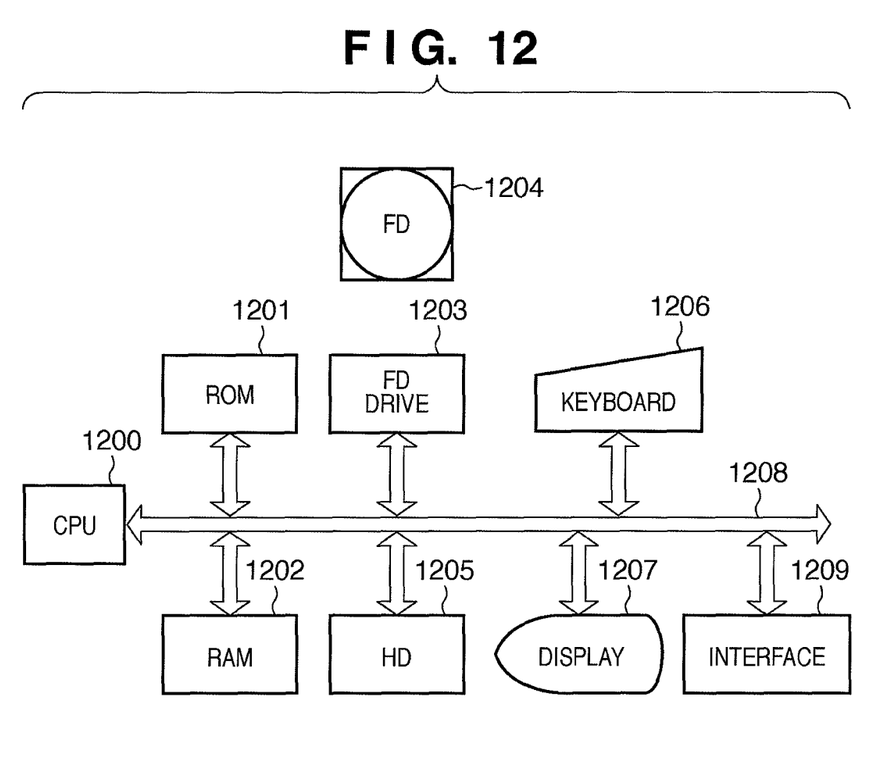
FIG. 12 is a diagram illustrating client and server configurations.

<Hardware Configuration>
FIG. 12 is a diagram illustrating the configuration of the client or the server. In FIG. 12, 1200 is a CPU that performs overall control of the apparatus. The CPU 1200 executes application programs and an OS, as well as an information processing program and so on according to the present embodiment, that are stored in a hard disk (HD) 1205. In addition, the CPU 1200 controls information, files, and the like necessary for the execution of programs to be temporarily stored in a RAM 1202.

Various types of data including programs such as a basic I/O program, font data and template data used when processing documents, and so on is stored within a ROM 1201. The RAM 1202 functions as the main memory, a working area, and so on for the CPU 1200.

Programs and the like stored in an FD (floppy disk) 1204 serving as a storage medium are loaded into the computer via an FD drive 1203.

The floppy disk (FD) 1204 serving as a storage medium is a storage medium in which are stored computer-readable programs. Note that the storage medium is not limited to an FD, and a CD-ROM, CD-R, CD-RW, PC card, DVD, smart memory card, MO, Memory Stick, or the like may be used.

The hard disk (HD) 1205 serving as a high-capacity memory stores application programs, printer driver programs, the OS, information processing programs, and other related programs.

A keyboard 1206 is used by a user when inputting instructions to the computer, such as device control commands and the like.

A display 1207 displays commands inputted through the keyboard 1206, printer statuses, and so on.

Data is exchanged within the computer via a system bus 1208.

The computer can also perform data communication with an external device via an interface 1209.

Note that the aforementioned computer configuration is merely exemplary, and the configuration is not limited to the exemplary configuration of FIG. 12. For example, the storage locations of data, programs, and so on may be varied between the ROM, RAM, HD, and so on depending on the characteristics thereof.

The workflow management system of the present embodiment may be configured so as to include a separate client and server, or, as described above, may be configured so that both the client software and the server software illustrated in FIG. 1 are installed in a single computer.

<Workflow Creation>

Next, the creation of a workflow according to the present embodiment shall be described.

First, a user logs in to the workflow management system via the client software 1000, and creates a workflow by specifying an arbitrary user and a task to be performed by the user.

Figure 2A:
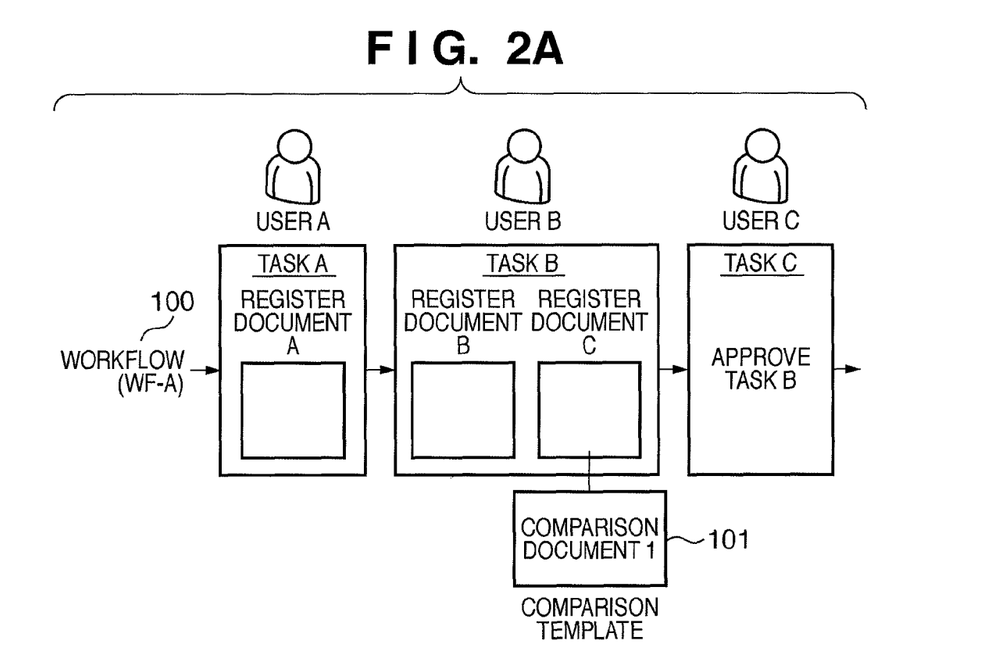
FIG. 2A is a diagram illustrating an outline of a workflow management system according to an embodiment.
Figure 2B:
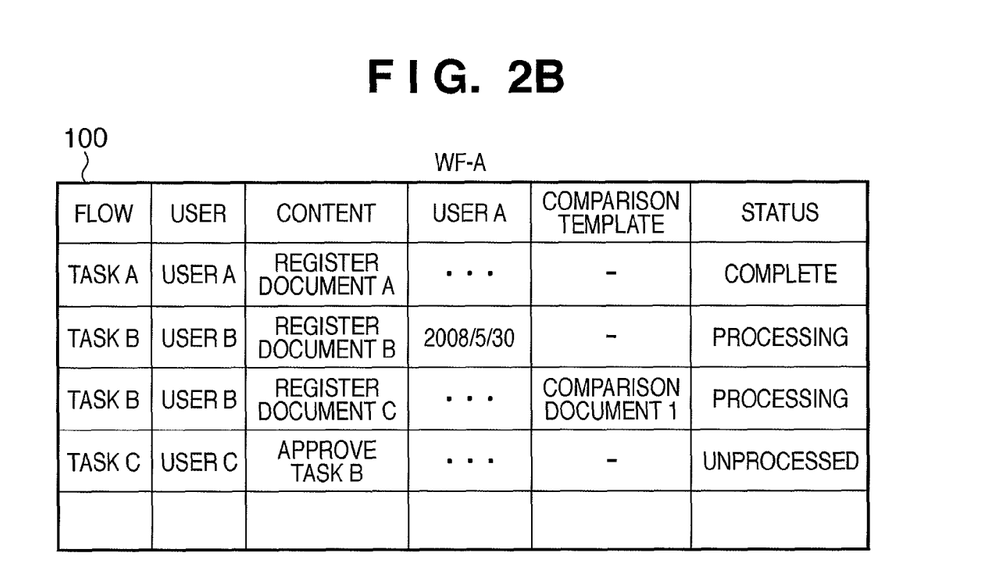
FIG. 2B is another diagram illustrating an outline of a workflow management system according to an embodiment.
Figure 3:
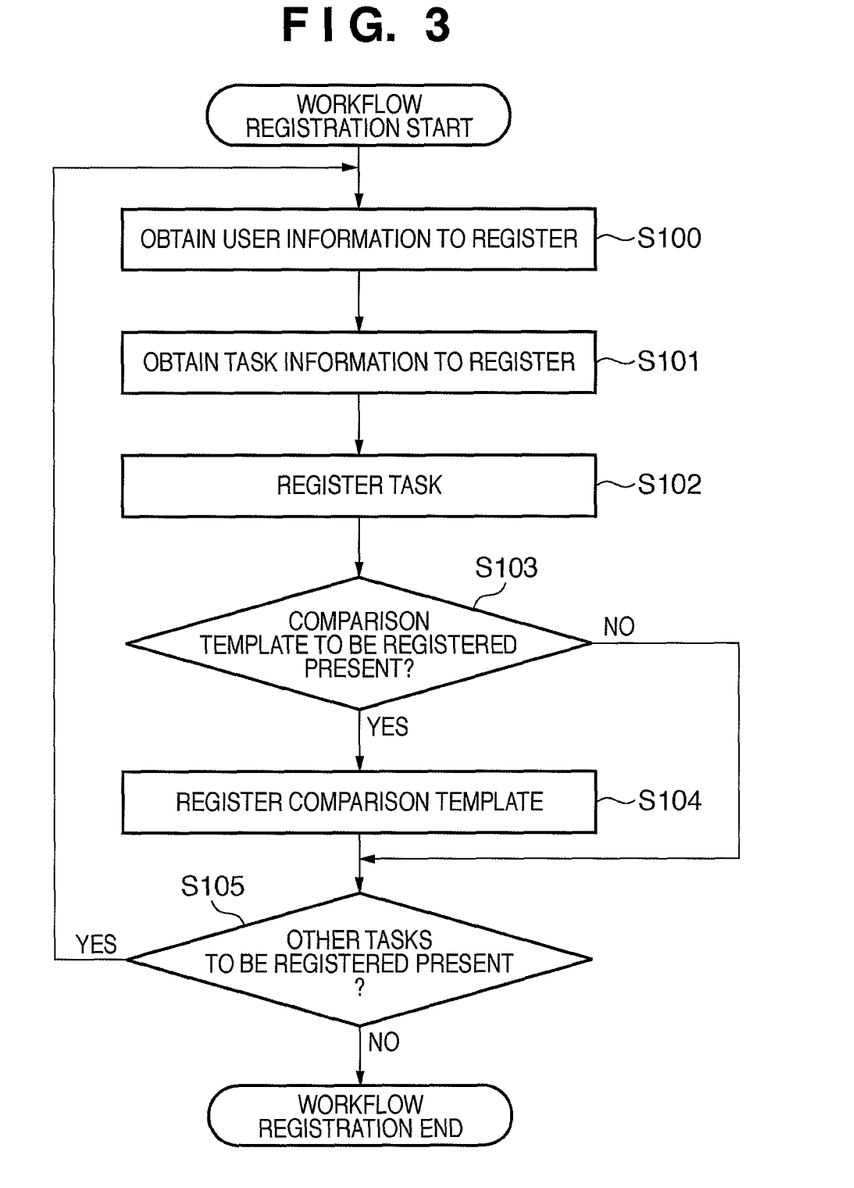
FIG. 3 is a flowchart illustrating a procedure for a workflow creation process.

FIGS. 2A and 2B are diagrams illustrating an outline of the workflow management system according to the present embodiment. FIG. 3, meanwhile, is a flowchart illustrating a procedure for the workflow creation process. Hereinafter, detailed descriptions shall be given with reference to FIGS. 2A, 2B, and 3.

FIG. 2A is a diagram illustrating an outline of the workflow management system, while FIG. 2B is a diagram illustrating a workflow 100 (workflow table) serving as an example of a workflow in which tasks are specified.

First, in step S100 of FIG. 3, the client accepts information of the users in charge of the tasks inputted via the user interface 1001 in order to create the workflow 100. After this, the users are identified by obtaining user information from the user management database 1107 of the server via the database control unit 1103. The "user information" here includes a user ID, username, department, position, and so on.

Next, in step S101, task information inputted via the user interface 1001 is obtained. The "task information" here includes the content of the task, the target document, the deadline, a comparison template, and so on. In the workflow 100, this task information is associated with a user.

The "comparison template" refers to a document used for comparison in which entries are made only for areas within a document that require an entry to be made. For example, the comparison template may be a document in which an entry has been made only in an estimate amount field, and may then be used in an estimate request task whereby the task meets the conditions for being a task if only an estimate amount has been entered as a temporary document.

In step S102, the user information and task information obtained in steps S100 and S101 are registered as a workflow.

In step S103, it is determined whether or not a comparison template to be added is present in a task registered in step S102. If it has been determined that there is a comparison template to be added, the procedure advances to step S104. However, if it has been determined that there is not a comparison template to be added, the procedure advances to step S105.

In step S104, a comparison template 101 is registered in a registered task.

In step S105, it is determined whether or not a task to be added is present. Here, if it is determined that there is a task to be added, steps S100 through S104 are repeated, thereby obtaining user information and task information, adding that information to the flow, and creating the workflow. However, if it is determined that there is no task to be added, the processing ends.

In summary, the workflow 100 illustrated in FIGS. 2A and 2B is created through the processing illustrated in FIG. 3, and the workflow 100 is then stored in, for example, the workflow database 1105 in the server.

<To-Do List Creation>

Next, the creation of a to-do list according to the present embodiment shall be described.

First, a user logs in to the workflow management system via the client software 1000, and creates a to-do list by specifying an arbitrary user and a task to be performed by the user.

Figure 4:
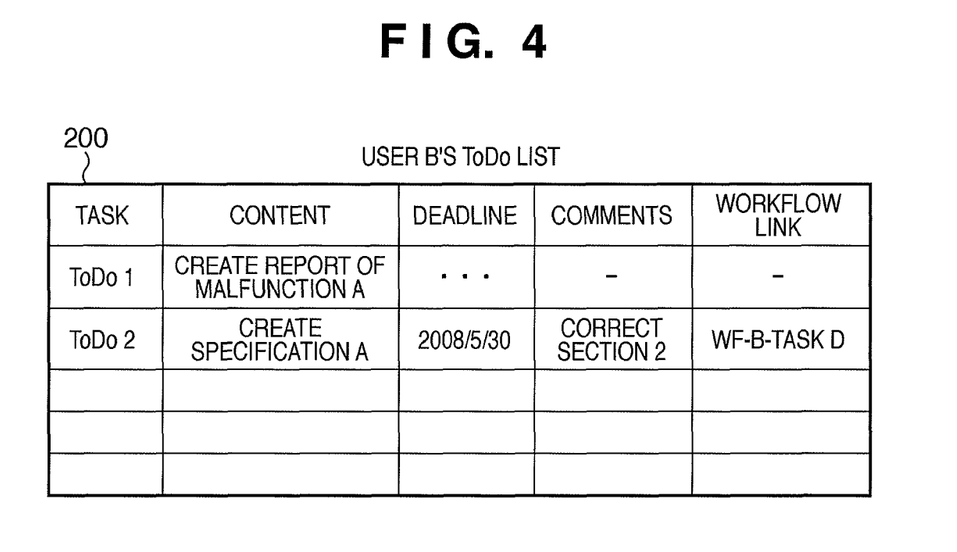
FIG. 4 is a diagram illustrating an example of a to-do list in the system.
Figure 5:
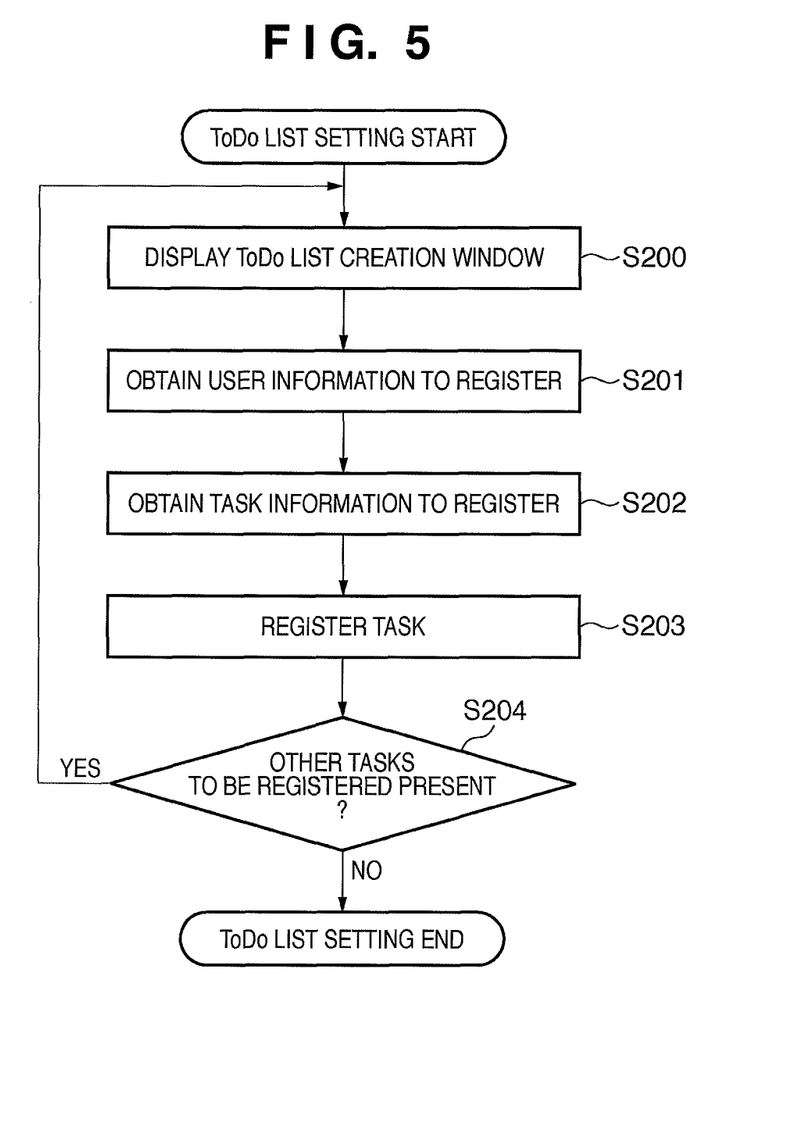
FIG. 5 is a flowchart illustrating a procedure for a to-do list creation process.

FIG. 4 is a diagram illustrating an example of a to-do list (a task list) in the system. Meanwhile, FIG. 5 is a flowchart illustrating a procedure for a to-do list creation process. Hereinafter, detailed descriptions shall be given with reference to FIGS. 4 and 5.

In order to create a to-do list 200 as shown in FIG. 4, first, in step S200, a to-do list creation window is displayed. Information received at this time from a user is user information and task information.

In step S201, the client accepts information of a user inputted via the user interface 1001, and obtains user information from the user management database 1107 of the server via the database control unit 1103. Here, the "user information" includes a user ID, username, department, position, and so on.

In step S202, task information inputted via the user interface 1001 is obtained. The "task information" here includes the content of the task, the target user, the target document, the deadline, comments, a workflow link, and so on. A "workflow link" is information linking the task registered in the to-do list with a workflow. For example, in FIG. 4, a task "create specification A" in the to-do list is indicated as being a task D in a workflow (WF-B). Workflow links are not registered by a user based on task information, but are instead set when tasks in a workflow are transferred to tasks of users in to-do lists, as shall be described later.

In step S203, the information obtained in steps S201 and S202 is registered in the to-do list of the corresponding user as a task. FIG. 4 illustrates, for example, a to-do list 200 of a user B.

In step S204, it is determined whether or not a task to be added is present. Here, if it is determined that there is a task to be added, steps S200 through S203 are repeated, thereby obtaining user information and task information and adding a task. However, if it is determined that there is no task to be added, the processing ends.

<Workflow Processing>

Hereinafter, the workflow processing performed by the workflow management system according to the present embodiment shall be described.

First, a user logs in to the system via the client software 1000 and processes the tasks defined by the workflow. In the present embodiment, when processing a task, unprocessed tasks are added to a to-do list, thereby completing the tasks of the workflow; the workflow being complete, the next flow is proceeded to.

Figure 6:
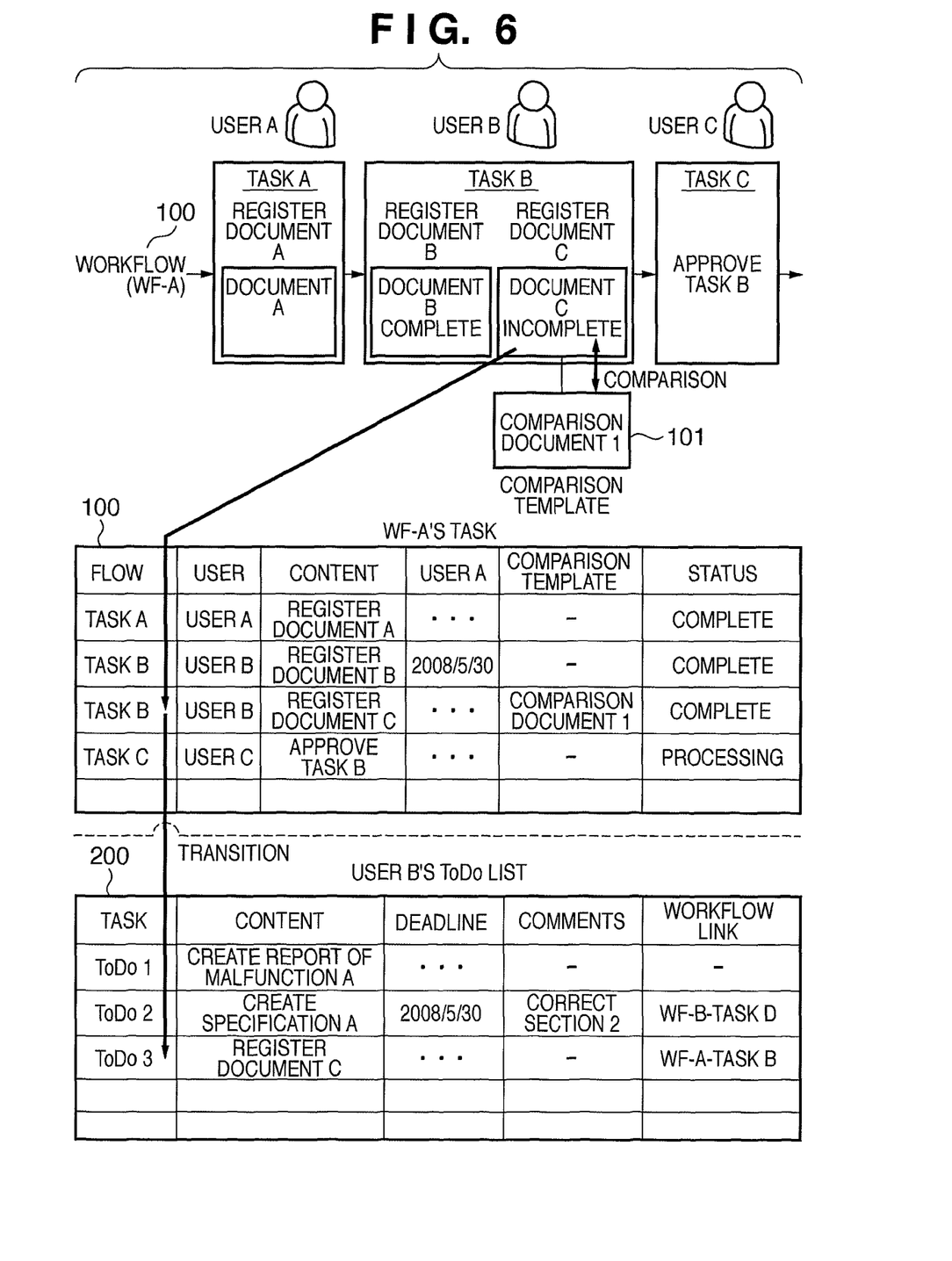
FIG. 6 is a diagram illustrating an outline of workflow processing in the system and the addition of a task to a to-do list in that processing.
Figure 7:
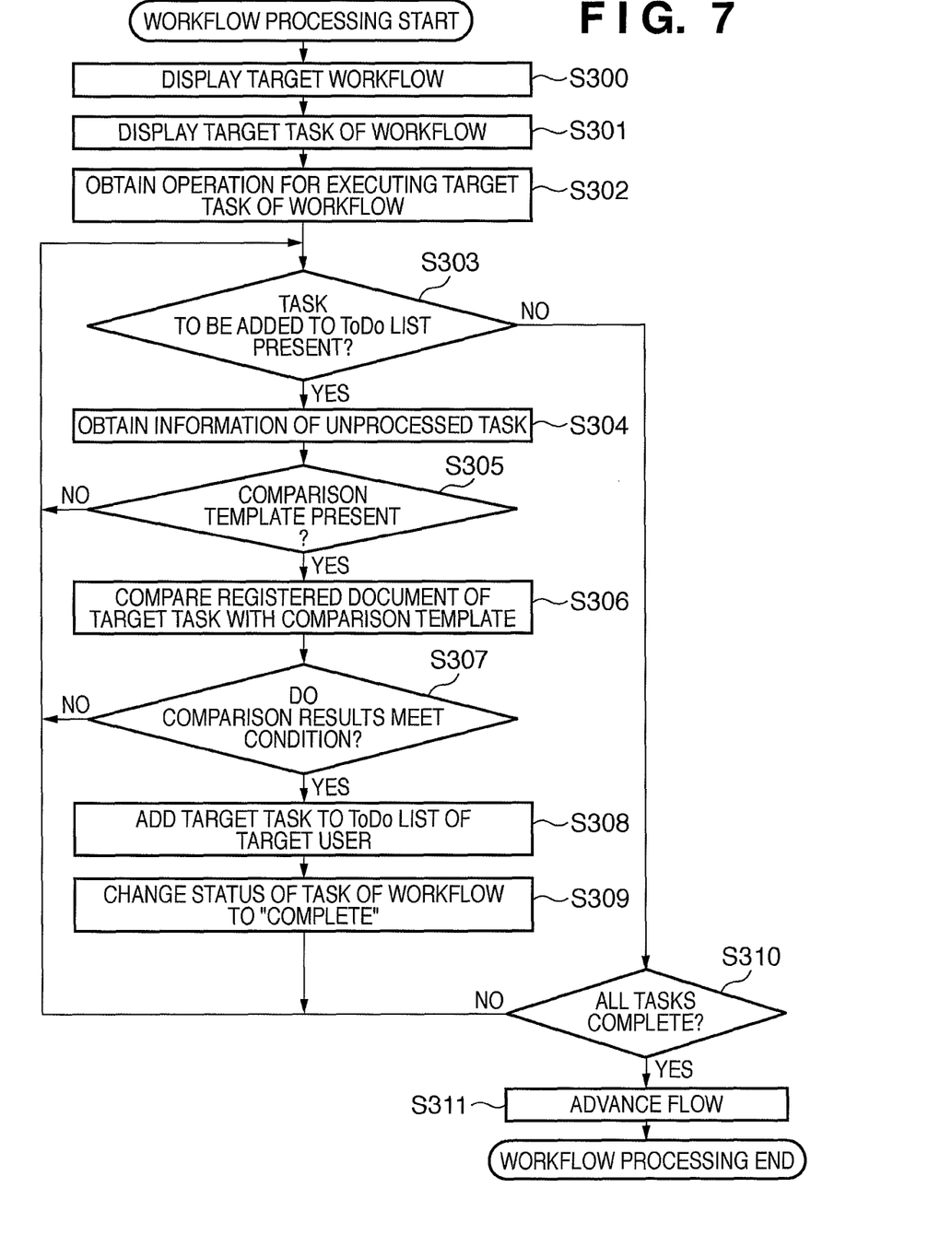
FIG. 7 is a flowchart illustrating a procedure for workflow processing and processing for adding a task to a to-do list in that processing.

FIG. 6 is a diagram illustrating an outline of workflow processing in the system and the addition of a task to a to-do list in that processing. Meanwhile, FIG. 7 is a flowchart illustrating a procedure for workflow processing and processing for adding a task to a to-do list in that processing. Hereinafter, detailed descriptions shall be given with reference to FIGS. 6 and 7.

In step S300 shown in FIG. 7, the current target workflow 100 (also called "WF-A" hereinafter) is displayed.

In step S301, if there is a target task to be processed by the corresponding user, that task is displayed. For example, if a user B has selected the workflow 100, a task B, which is a task to be performed by the user B, is displayed.

In step S302, the user interface 1001, which has accepted the processing result of the workflow task performed by the user, transmits that processing result to the command control unit 1002. Because this is a process for a task in a workflow, that process is transmitted from the command control unit 1002 to the workflow control unit 1005.

For example, as indicated in the workflow 100 shown in FIG. 6, the user B's tasks are registering documents B and C, and thus the registration of the documents B and C are carried out. However, as shown in FIG. 6, the document B has already been processed, whereas the document C has not yet been processed. If, as shown here, the user B has not yet completed the registration of the document C, the system accepts, from the user, a to-do list transfer operation.

Although two tasks, or the registration of the document B and the registration of the document C, are denoted in FIG. 6, the system accepts a to-do list transfer operation from the user even in the case where there is only a single task and that task has not yet been processed.

In step S303, it is determined whether or not there is a task to add to the to-do list based on the results of the process in step S302. A "task to be added to the to-do list" refers to, as described above, an incomplete task that has not yet been processed. Here, if it has been determined that there is a task to be added to the to-do list, the procedure advances to step S304, whereas if it has been determined that there is no task to be added, the procedure advances to step S310.

In step S304, information of the task to be added to the to-do list is obtained. The "information of the task to be added to the to-do list" is, for example, information regarding the registration of the document C, as shown in FIG. 6.

A case can also be considered where a task is added to the to-do list as a task of a user other than the user that carried out the to-do list transfer operation. A user may be specified in the process for transferring tasks to the to-do list in such a case as well, in order to make it possible to specify which user's to-do list the task is to be added to.

In step S305, it is determined whether or not a comparison template is defined for the task corresponding to the information obtained in step S304. Here, if it is determined that a comparison template is defined, the procedure advances to step S306, whereas if it is determined that a comparison template is not defined, the procedure returns to step S303.

In step S306, the registered document in the target task is compared to the comparison template 101 registered in the workflow database 1105. For example, a temporary document C that has been temporarily registered in a task "document C registration" is compared with a comparison document 1 registered as a comparison template (the comparison template 101 shown in FIG. 6).

In step S307, it is determined whether or not the result of the comparison in step S306 meets a predetermined condition (a second determination). Whether or not the result "meets a condition" refers to, for example, whether or not only the estimate amount is entered, in the situation described above. Here, if it has been determined that the result meets the condition, the procedure advances to step S308, whereas if it has been determined that the result does not meet the condition, the procedure returns to step S303.

In step S308, the target task is added to the to-do list 200 of the target user. For example, as shown in FIG. 6, the task "document C registration" is added to the to-do list 200 of the user B, and link information "WF-A-Task B" for linking to that workflow is added to the workflow link information field of the to-do list.

In step S309, the status of the task transferred to the to-do list 200 of the target user in step S308 is changed to "complete". For example, the status of the task "document C registration" in the workflow 100 shown in FIG. 6 is changed to "complete".

After step S309, the process once again returns to step S303. If it has been determined in step S303 that there is no task to be added to the tasks of the to-do list from the workflow, it is determined in step S310 whether or not all the tasks are complete. For example, if task B in the workflow is currently being processed, it is determined whether or not both the tasks "document B registration" and "document C registration" in the task B are complete. Here, if it has been determined that all the tasks are complete, the procedure advances to step S311, whereas if it has been determined that not all the tasks are complete, the procedure returns to step S303.

In step S311, advancement control is performed so as to advance to the next flow in the workflow.

As described thus far, in the present embodiment, when a target task of the workflow is transferred to a task in the to-do list of a user, link information linking that task to the target task in the workflow is included as an attribute of the task in the to-do list. As a result, which user's to-do list the task has been transferred to can be discovered by searching based on the workflow task.

Note that in the present embodiment, a user can not only manage tasks transferred from a workflow through a to-do list, but can also use a to-do list to manage tasks for documents registered in the workflow management system through a normal usage method.

<To-Do List Processing>

Hereinafter, the to-do list processing performed by the workflow management system according to the present embodiment shall be described.

First, a user logs in to the workflow management system via the client software 1000 and processes the tasks defined by the to-do list. When processing the tasks, a task completion notification and document registration process are carried out for completed tasks in the case where the original registration location of those tasks is the workflow.

Figure 8:
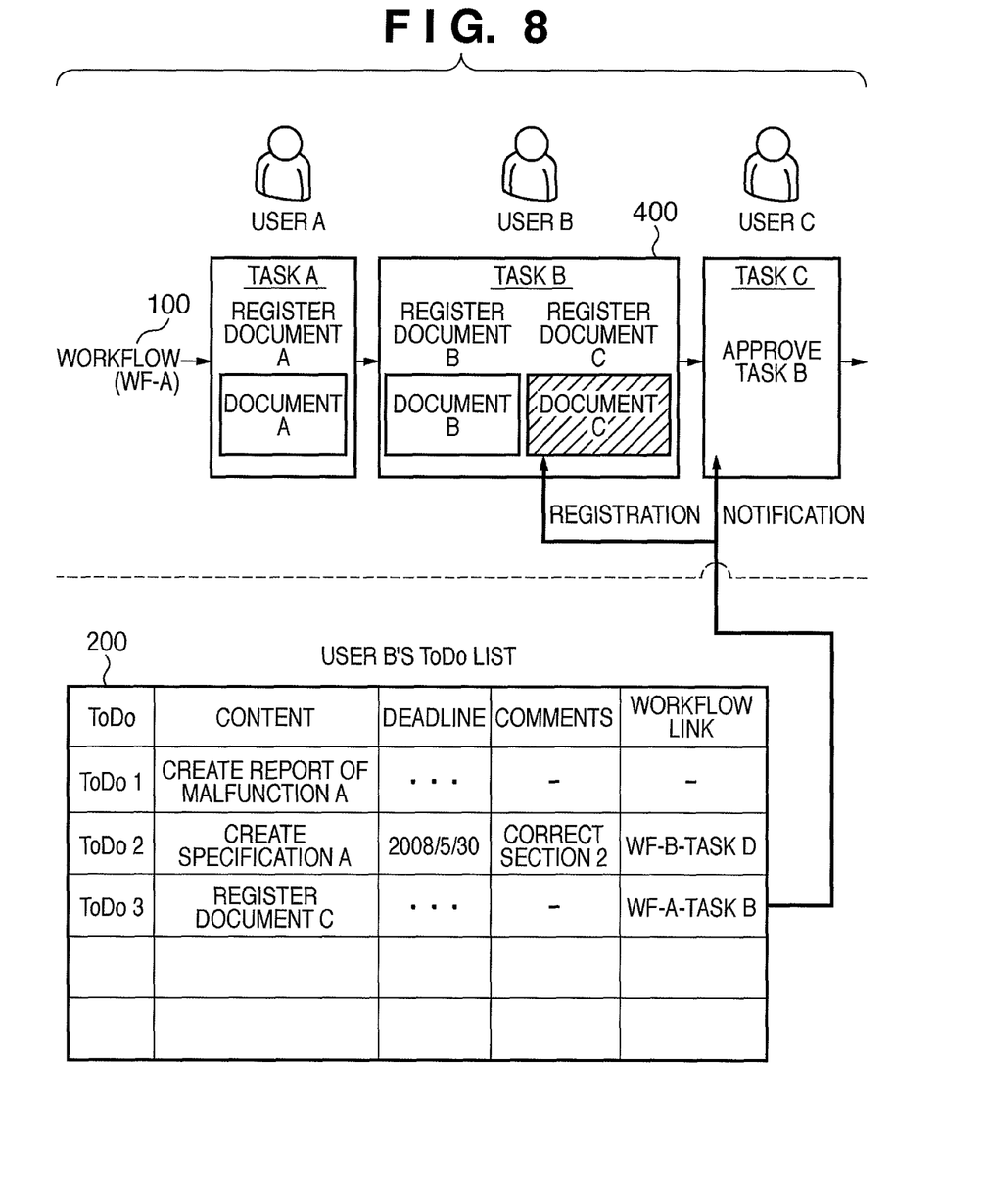
FIG. 8 is a diagram illustrating an outline of a process for completing a task in a to-do list, a workflow being notified thereof, and a document registration process according to an embodiment.
Figure 9:
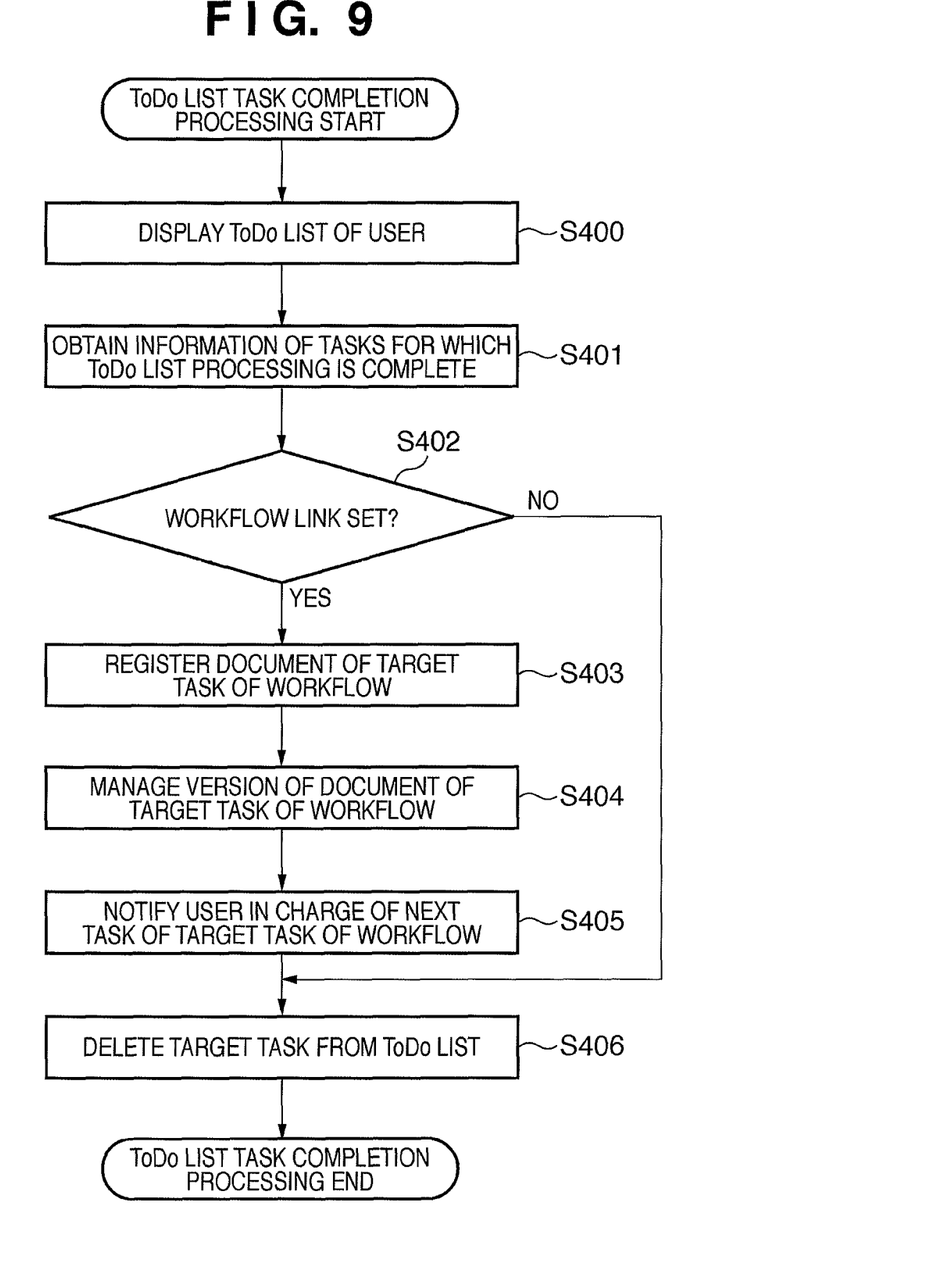
FIG. 9 is a flowchart illustrating a procedure for a process for completing a task in a to-do list, a workflow being notified thereof, and a document registration process.

FIG. 8 is a diagram illustrating an outline of a process for completing a task in a to-do list, a workflow being notified thereof, and a document registration process. FIG. 9, meanwhile, is a flowchart illustrating a procedure for a process for completing a task in a to-do list, a workflow being notified thereof, and a document registration process. Hereinafter, detailed descriptions shall be given with reference to FIGS. 8 and 9.

First, in step S400 shown in FIG. 9, the client displays the to-do list of a user that has logged in to the workflow management system via the client software 1000. To be more specific, the to-do list of the user B shown in FIG. 8 is displayed.

In step S401, the information of a completed task, which is a task in the to-do list that has been processed, is obtained.

In step S402, it is determined whether or not a workflow link is set for the completed task obtained in step S401. If it is determined that a workflow link is set, the procedure advances to step S403, where the document for which processing was completed in the target task is registered in the target task of the workflow based on that link. For example, as shown in FIG. 8, the document C, whose creation was completed in the task "To-Do 3", is registered in the task B of the workflow 100 (WF-A) as a task "register document C".

However, if it has been determined in step S402 that a workflow link is not set, the procedure advances to step S406.

In step S404, a document temporarily registered prior to the document registered in step S403 is registered as a past version. In other words, the document C that has been processed by the user B is specified as a processed document in the workflow in place of the temporary document.

In step S405, the user in charge of the next task following the target task is notified of the registration process performed on the target task in step S403 (shown in FIG. 8). Here, the notification method may be notification by e-mail, notification using a message in the workflow management system, or the like.

In step S406, the target task in the to-do list is deleted from the to-do list. In other words, in FIG. 8, the to-do 3 task is displayed in the to-do list 200, but this task is deleted after the processing of step S406.

As described thus far, in the present embodiment, a user referring to a to-do list and processing the tasks registered in that list makes it possible to simultaneously advance a workflow in the workflow management system. Accordingly, because the workflow management system is linked with the to-do list at the user level, tasks in a workflow of the workflow management system can be managed with ease.

In addition, because it is not absolutely necessary for a user in a workflow of the workflow management system to complete all of his or her tasks, the workflow can be advanced flexibly and quickly.

Second Embodiment

Next, a second embodiment shall be described with reference to FIGS. 10 and 11.

The workflow management system according to the present second embodiment differs from that of the first embodiment in that tasks are transferred to the to-do list of the user through a user approval process rather than a process that uses a comparison template.

<Workflow Processing>

First, a user logs in to the workflow management system via the client software 1000 and processes the tasks defined by a workflow. When processing these tasks, unprocessed tasks are added to the to-do list of a user, thereby completing the tasks in terms of the workflow, and advancing to the next workflow.

Figure 10:
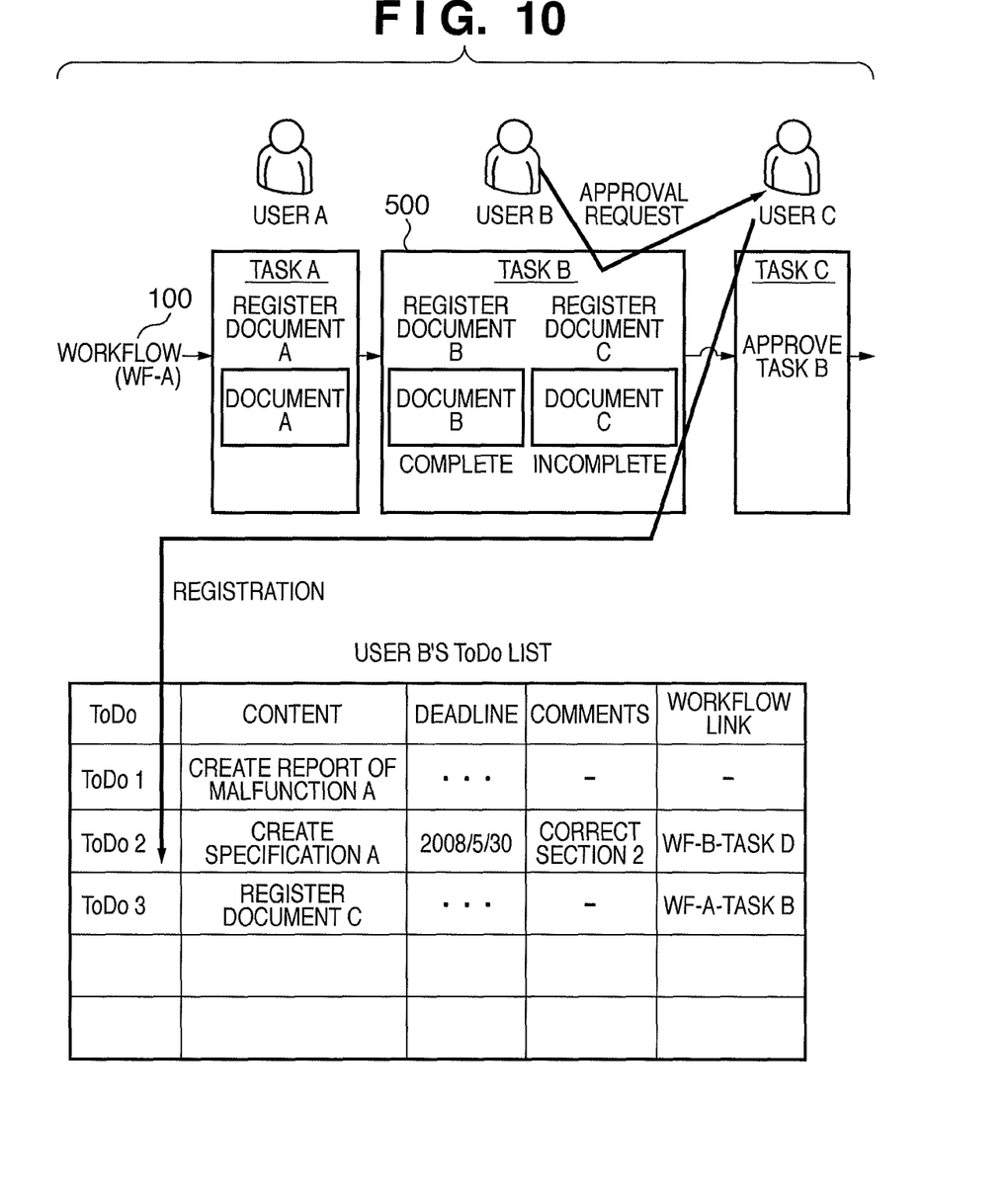
FIG. 10 is a diagram illustrating an outline of workflow processing and the addition of a task to a to-do list according to an embodiment.

FIG. 10 is a diagram illustrating an outline of workflow processing and the addition of a task to a to-do list according to an embodiment. FIG. 11, meanwhile, is a flowchart illustrating a procedure for workflow processing and processing for adding a workflow task to a to-do list. Hereinafter, detailed descriptions shall be given with reference to FIGS. 10 and 11.

Figure 11:
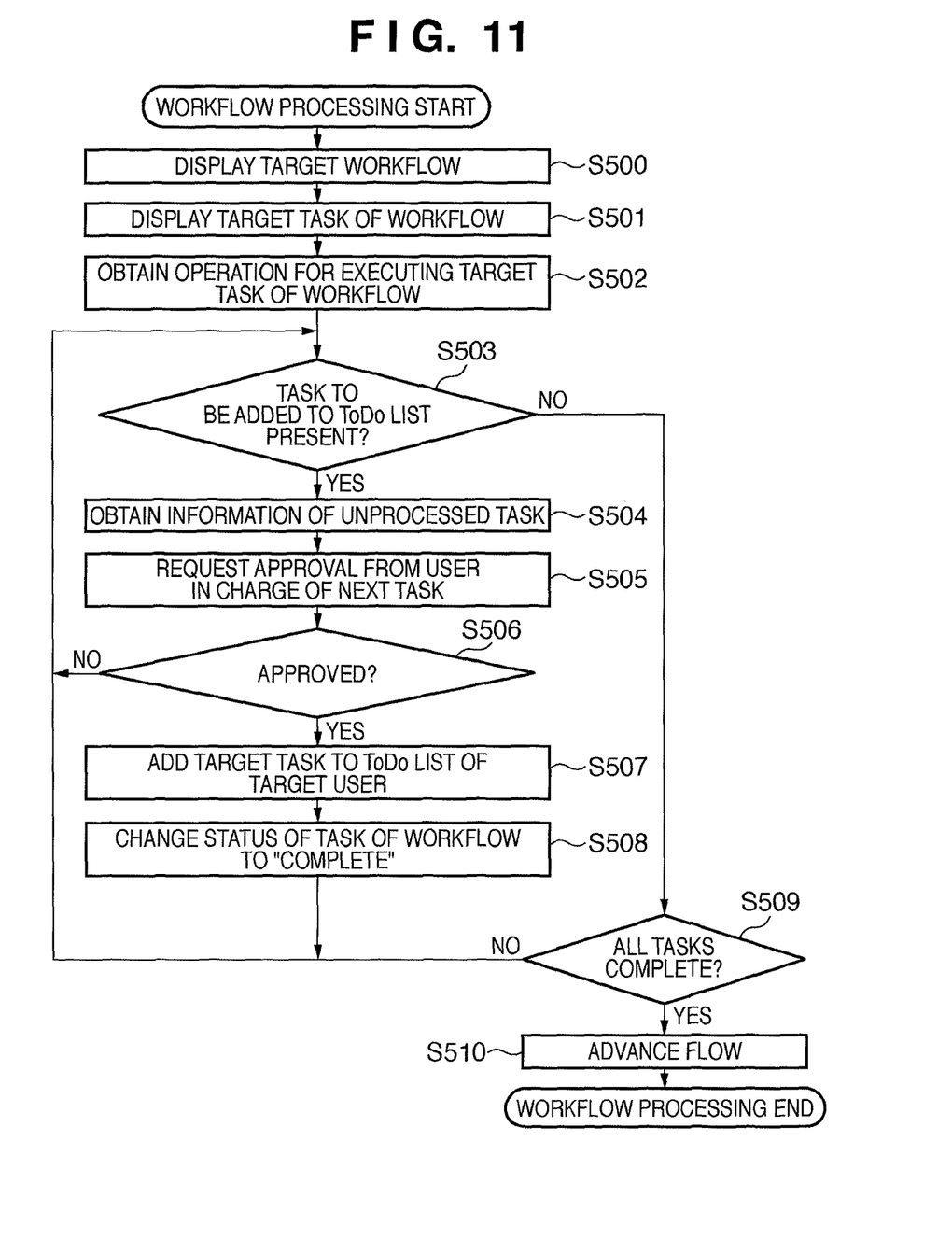
FIG. 11 is a flowchart illustrating a procedure for workflow processing and processing for adding a workflow task to a to-do list.

First, in step S500 shown in FIG. 11, the target workflow is displayed. At this time, a workflow selected by the user from a workflow list is displayed. Here, for example, the workflow 100 (WF-A) is selected and displayed.

In step S501, if there is a target task that is to be processed by the user, that task is displayed. For example, if a user B has selected the workflow 100 (WF-A), and a task B is present as a task of the user B, the task B is displayed.

In step S502, the user interface 1001, which has accepted the processing result of the workflow task from the user, transmits that processing result to the command control unit 1002. Because this is a process for a task in a workflow, that process is transmitted from the command control unit 1002 to the workflow control unit 1005.

For example, as shown in FIG. 10, the tasks of the user B are "document B registration" and "document C registration", and therefore the user B registers the documents B and C. At this time, the user B has not yet completed the processing for the registration of the document C, and therefore the system accepts a to-do list addition operation.

In step S503, it is determined whether or not there is a task to be added to the to-do list. Here, if it has been determined that there is a task to be added to the to-do list, the procedure advances to step S504, whereas if it has been determined that there is no task to be added, the procedure advances to step S509.

In step S504, information of the task to be added to the to-do list is obtained. A "task to be added to the to-do list" is, to rephrase, an unprocessed task. The "document C registration" shown in FIG. 10 is an example of such an unprocessed task.

In step S505, an approval request for the task accepted in step S504 is issued to the user in charge of the next task in the workflow. When issuing the approval request, information of that task and a temporarily-registered document are sent to the user to whom the approval request is issued.

In step S506, it is determined whether or not the task has been approved by the user in charge of the next task. Here, if it has been determined that the task has been approved, the procedure advances to step S507. However, if it has been determined that the task has not been approved, the procedure returns to step S503.

In step S507, the target task is added to the to-do list of the target user. For example, the task "document C registration" is added to the to-do list of the user B, and "WF-A-Task B" is added to the workflow link field in the to-do list as link information.

In step S508, the status of the workflow task corresponding to the task transferred to the to-do list of the target user in step S507 is changed to "complete".

After the processing in step S508, the procedure returns once again to step S503, and if there is no task to be added from the workflow to the to-do list, it is confirmed in step S509 that all the tasks have been completed.

For example, if task B in the workflow is currently being processed, it is determined whether or not both the task "document B registration" and the task "document C registration" in the task B are complete.

If it has been determined in step S509 that all the tasks are complete, the procedure advances to step S510, whereas if it has been determined that not all the tasks are complete, the procedure returns to step S503.

In step S510, the next flow in the workflow is advanced to.

As described thus far, in the present embodiment, the user in charge of the next task in the workflow is requested to approve a task in the case where a comparison template, as shown in FIGS. 2A and 2B, was not registered when the workflow was set. When approval has been obtained as a result, the workflow task is transferred to the to-do list of the user, thereby making it possible to advance the workflow.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-010405, filed Jan. 20, 2009, which is hereby incorporated by reference herein in its entirety.

What is claimed is:

1. A workflow management apparatus having at least one processor that manages a workflow composed of one or more workflow-tasks for processing documents, the apparatus comprising:
    a to-do list creation unit configured to create a to-do list corresponding to each user, wherein the to-do list is composed of at least one to-do-task, and wherein a task which is created based on information input via a user interface is able to be registered as the to-do task into the to-do list;
    a first determination unit configured to determine whether or not there is a current workflow-task to be added to the to-do list;
    a second determination unit configured to, in a case where the first determination unit determines that there is the current workflow-task to be added to the to-do list and a temporary document is registered for the current workflow-task, determine whether or not the registered temporary document meets a predetermined condition;
    a registration unit configured to, in a case where the second determination unit determines that the registered temporary document meets the predetermined condition, register the current workflow-task as the to-do task into the to-do list of a user corresponding to the current workflow-task, wherein the to-do list includes both the task created based on the information input via the user interface and the current workflow-task registered by the registration unit;
    an advancement control unit configured to, in a case where the current workflow-task has been registered into the to-do list by the registration unit, advance to a processing of a next workflow-task in the workflow even if the current workflow-task has not yet been processed;
    a third determination unit configured to, in a case where a processing of the to-do task registered in the to-do list is completed by a user, determine whether or not the completed to-do task is the workflow-task registered by the registration unit;
    a notification unit configured to notify a user corresponding to the next workflow-task in the workflow of the completion, in a case where the third determination unit determines that the completed to-do task is the workflow-task registered by the registration unit; and
    a second registration unit configured to, in a case where a processing of the to-do task for the temporary document is completed by the user, register a document for which the processing was completed in place of the temporary document in the current workflow.

2. The workflow management apparatus according to claim 1, wherein the current workflow-task registered as the to-do task into the to-do list by the registration unit is associated with the workflow corresponding to the current workflow-task.

3. The workflow management apparatus according to claim 1, further comprising a workflow table in which the one or more workflow-tasks are associated with respective users.

4. A workflow management method executed in a workflow management apparatus having at least one processor that manages a workflow composed of one or more workflow-tasks for processing documents and includes a to-do list creation unit configured to create a to-do list corresponding to each user, wherein the to-do list is composed of at least one to-do-task, and wherein a task which is created based on information input via a user interface is able to be registered as the to-do task into the to-do list, the method comprising the steps of:
    determining whether or not there is a current workflow-task to be added to the to-do list;
    determining, in a case where the first determining step determines that there is the current workflow-task to be added to the to-do list and a temporary document is registered for the current workflow-task, whether or not the registered temporary document meets a predetermined condition;
    registering, in a case where the second determining step determines that the registered temporary document meets the predetermined condition, the current workflow-task as the to-do task into the to-do list of a user corresponding to the current workflow-task, wherein the to-do list includes both the task created based on the information input via the user interface and the current workflow-task that has been registered;
    advancing, in a case where the current workflow-task has been registered into the to-do list, to a processing of a next workflow-task in the workflow even if the current workflow-task has not yet been processed;
    determining, in a case where a processing of the to-do task registered in the to-do list is completed by a user, whether or not the completed to-do task is the workflow-task registered in the registering step;
    notifying a user corresponding to the next workflow-task in the workflow of the completion, in a case where it is determined that the completed to-do task is the workflow-task registered in the registering step; and
    registering, in a case where a processing of the to-do task for the temporary document is completed by the user, a document for which the processing was completed in place of the temporary document in the current workflow.

5. A non-transitory computer-readable storage medium in which is stored workflow management program for a workflow management apparatus having at least one processor that manages a workflow composed of one or more workflow-tasks for processing documents, wherein the workflow management apparatus includes a to-do list creation unit configured to create a to-do list corresponding to each user, wherein the to-do list is composed of at least one to-do-task, and wherein a task which is created based on information input via a user interface is able to be registered as the to-do task into the to-do list, the program causing a computer to:

- determine whether or not there is a current workflow-task to be added to the to-do list;
- determine, in a case where it has been determined that there is the current workflow-task to be added to the to-do list and a temporary document is registered for the current workflow-task, whether or not the registered temporary document meets a predetermined condition;
- register, in a case where it has been determined that the registered temporary document meets the predetermined condition, the current workflow-task as the to-do task into the to-do list of a user corresponding to the current workflow-task, wherein the to-do list includes both the task created based on the information input via the user interface and the current workflow-task that has been registered;
- advance, in a case where the current workflow-task has been registered into the to-do list, to a processing of a next workflow-task in the workflow even if the current workflow-task has not yet been processed;
- determine, in a case where a processing of the to-do task registered in the to-do list is completed by a user, whether or not the completed to-do task is the registered workflow-task;
- notify a user corresponding to the next workflow-task in the workflow of the completion, in a case where it is determined that the completed to-do task is the registered workflow-task; and
- register, in a case where a processing of the to-do task for the temporary document is completed by the user, a document for which the processing was completed in place of the temporary document in the current workflow.

* * * * *